US010533376B2

(12) United States Patent
Reimers

(10) Patent No.: US 10,533,376 B2
(45) Date of Patent: Jan. 14, 2020

(54) REGULATING DEVICE AND A METHOD OF USING SAME IN A BOREHOLE

(71) Applicant: Tomax AS, Stavanger (NO)

(72) Inventor: Nils Reimers, Bjoa (NO)

(73) Assignee: Tomax AS, Stavanger (NO)

( * ) Notice: Subject to any disclaimer, the term of this patent is extended or adjusted under 35 U.S.C. 154(b) by 203 days.

(21) Appl. No.: 15/524,671

(22) PCT Filed: Jan. 26, 2016

(86) PCT No.: PCT/NO2016/050009
§ 371 (c)(1),
(2) Date: May 5, 2017

(87) PCT Pub. No.: WO2016/122329
PCT Pub. Date: Aug. 4, 2016

(65) Prior Publication Data
US 2017/0342781 A1    Nov. 30, 2017

(30) Foreign Application Priority Data
Jan. 29, 2015    (NO) .................................. 20150131

(51) Int. Cl.
*E21B 4/10*        (2006.01)
*F16F 13/00*       (2006.01)
(Continued)

(52) U.S. Cl.
CPC .............. *E21B 4/10* (2013.01); *E21B 17/073* (2013.01); *F16F 9/26* (2013.01); *F16F 13/00* (2013.01)

(58) Field of Classification Search
CPC ........... F16F 13/00; F16F 9/26; E21B 17/073; E21B 10/36; E21B 1/00; E21B 4/06; E21B 4/10
See application file for complete search history.

(56) References Cited

U.S. PATENT DOCUMENTS 3,073,134 A    1/1963  Mann
3,225,566 A   12/1965  Leathers
(Continued)

FOREIGN PATENT DOCUMENTS

NO         315209      7/2003
WO     2015/076825     5/2015

OTHER PUBLICATIONS

Norwegian Search Report, Norwegian Patent Application No. 21050131, dated Aug. 29, 2015.
(Continued)

*Primary Examiner* — Brad Harcourt
(74) *Attorney, Agent, or Firm* — Andrus Intellectual Property Law, LLP

(57) ABSTRACT

A regulating device is for use in a drill string between a drilling machine and a drill bit. The regulating device has a tubular female portion which at least partly encloses a tubular male portion; a helical coupling between the female portion and the male portion to allow a telescoping movement of the regulating device in both directions between a fully extended position and a fully retracted position, the movement of the regulating device occurring when there is a difference in rotational speed between the female portion and the male portion; a first biasing device which is arranged to exert a driving force to drive the regulating device towards its extended position; and a second biasing device.

11 Claims, 5 Drawing Sheets

(51) Int. Cl.
  *F16F 9/26* (2006.01)
  *E21B 17/07* (2006.01)

(56) References Cited

U.S. PATENT DOCUMENTS

| | | |
|---|---|---|
| 3,329,221 A | 7/1967 | Walker |
| 3,382,936 A | 5/1968 | Galle |
| 3,396,807 A * | 8/1968 | Menton .................. E21B 4/10 175/293 |
| 3,871,193 A | 3/1975 | Young |
| 3,947,008 A | 3/1976 | Mullins |
| 3,963,228 A | 6/1976 | Karle |
| 4,054,040 A | 10/1977 | Medders |
| 4,133,516 A | 1/1979 | Jurgens |
| 4,162,619 A | 7/1979 | Nixon, Jr. |
| 4,173,130 A | 11/1979 | Sutliff et al. |
| 4,186,569 A | 2/1980 | Aumann |
| 4,194,582 A | 3/1980 | Ostertag |
| 4,210,316 A | 7/1980 | Hall |
| 4,211,290 A | 7/1980 | Mason et al. |
| 4,257,245 A | 3/1981 | Toelke et al. |
| 4,303,138 A | 12/1981 | Bassinger |
| 4,398,898 A | 8/1983 | Odom |
| 4,434,863 A | 3/1984 | Garrett |
| 4,901,806 A | 2/1990 | Forrest |
| 6,308,940 B1 | 10/2001 | Anderson |
| 7,044,240 B2 * | 5/2006 | McNeilly .................. E21B 4/02 175/299 |
| 2012/0228029 A1 | 9/2012 | Reimers |
| 2014/0090892 A1 | 4/2014 | Montgomery |
| 2014/0262650 A1 | 9/2014 | Eppink |

OTHER PUBLICATIONS

International Search Report, PCT/NO2016/050009, dated Apr. 25, 2016.
Written Opinion, PCT/NO2016/050009, dated Apr. 25, 2016.
Response to Written Opinion, PCT/NO2016/050009, filed Jul. 12, 2016.
Written Opinion, PCT/NO2016/050009, dated Oct. 20, 2016.
International Preliminary Report on Patentability, PCT/NO2016/050009, dated Jan. 9, 2017.

* cited by examiner

REGULATING DEVICE AND A METHOD OF USING SAME IN A BOREHOLE

FIELD

The present invention relates to a regulating device and a method of using the regulating device in a borehole in the ground. More particularly, it relates to a regulating device for use in a drill string between a drilling machine and a drill bit, the regulating device being configured to limit a reaction force against the drill bit when this is being fed in to establish a work surface at the bottom of the borehole or hits rocks or formations of different characteristics.

BACKGROUND

To reduce the risk of damage to the drill bit in consequence of limited control of the exact position of and strain on the drill bit in deep boreholes, it is known to use solutions pertaining to the design of the drill bit itself. Some of the solutions aim at making the drill bit less aggressive and thereby less sensitive when meeting a work surface against which the drill bit is brought. An example of one such solution used is the reduction of a so-called angle of attack of the cutting elements of the drill bit, so that less reactive force is produced in relation to weight-on-bit. Weight-on-bit is a known term in the drilling industry and relates to the axial force exerted by the drill bit against the work surface. With reduced reactive force, a lower risk of vibrations in the radial direction of the drill bit is achieved. In the specialist environment, such vibrations are known as "stick-slip" which is a stop-and-start motion or "jerking". The same object is sought to be achieved by producing the cutting elements of the drill bit with a bevel instead of a straight cutter angle.

Generally, the drawback of such solutions is that a considerable increase in weight-on-bit is required when the cutters are to establish engagement in hard rock. Such an increased weight-on-bit is exponentially reflected in increased frictional heat in the cutting elements of the drill bit, which constitutes a technological barrier; the cutting elements that are used in a drill bit for drilling a subsea formation or a rock on land, are made, in the main, from polycrystalline or synthetic diamond in which the diamond fragments are bonded together into circular plates by the use of cobalt. This material combination is sensitive to heat, and the strength is reduced exponentially from 350° C. In reality, said increased frictional heat in the cutting elements of the drill bit causes existing solutions, with protection of the drill bit when being fed in, to be incompatible with drilling in bedrock, for example. This is a considerable barrier to economic utilization of geothermal heat and deep oil and gas deposits.

Consequently, optimum utilization of such sharp, energy-efficient cutting elements that are necessary for cutting hard rock without overheating must be based on principles other than reduced angle of attack and increased supporting surface. The prior art is common, axial shock absorbers for a drill string. Such shock absorbers went through a rapid development in the period from around 1960 to around 1980 and gained considerable ground together with roller bits.

From this period, the following publications are known: U.S. Pat. Nos. 3,073,134, 3,225,566, 3,329,221, 3,382,936, 3,947,008, 3,963,228, 4,054,040, 4,133,516, 4,162,619, 4,173,130, 4,186,569, 4,194,582, 4,210,316, 4,211,290, 4,257,245, 4,303,138, 4,398,898, 3,871,193 and 4,901,806.

Out of the above-mentioned publications, the publication U.S. Pat. No. 4,186,569 is particularly interesting, as it discloses an axial shock absorber to be built into a drill string with the object of preventing axial vibrations and shocks during drilling. The object is achieved by using a telescopic unit with straight, axial splines to transmit torque, the unit being kept extended by means of springs. Oil is used as the damping medium in accordance with a known principle. Of particular interest in this device is a separate counterspring, the purpose of which is to balance the force from internal pressure and stretching from the gravitational force acting from the part of the drill string that is arranged below the unit in the direction of the drill bit when the drill bit is free, above the bottom, that is, or has low weight-on-bit.

However, axial shock absorbers were phased out with the introduction of drill bits with shearing cutters as these have insignificant vibration challenges in the axial direction, but all the more risk from impacts or jerking in the radial direction. Such impacts or jerking may occur especially when the drill bit is being fed into the borehole and at transition zones between rocks or formations of different characters, typically at the transition from one rock to a subsequent harder rock.

From the publication US 20140090892, an apparatus for maintaining so-called "weight-on-bit", or "thrust" which is the axial force exerted by the drill bit against the work surface during a drilling operation, is known. The apparatus is a rotationally rigid damping device arranged to damp axial vibrations in a drill string.

A more suited solution for reducing said impacts or jerking is a torque converter of the kind that transforms undesired impacts and "peaks" in the torque into a mechanically controlled axial motion which proportionally relieves the drill bit. However, this solution requires rigid internal compression springs. This rigidity makes the torque converter give little or no protection at low strains, for example in the engagement phase. That is to say, as the drill bit is brought into engagement with a rock.

The latter mechanical torque converters for drill strings were developed somewhat later than axial shock absorbers for drill bits. Such mechanical torque converters are known from the publications U.S. Pat. No. 7,044,240 and NO 315209.

Said publications NO 315209 and U.S. Pat. No. 7,044,240 disclose torque converters for building into a drill string with the object of preventing overload from torque variation during drilling. The object is achieved by using a telescopic unit with an internal, steep thread coupling, wherein the unit is kept extended or expanded by means of great cooperating forces provided by means of a compression spring and internal fluid pressure and the gravitational force acting on the part of the drill string that is arranged below the unit, in the direction of the drill bit, that is. Undesired impacts and torque peaks are converted through the threaded coupling into an axial contraction proportionally relieving the drill bit. The expansion forces mentioned above have as their purpose to restore the axial force on the drill bit as soon as the torque load decreases. A person skilled in the art will know that such expansion forces must be large. However, large expansion forces have the disadvantageous effect of the torque converter being fully extended and in practice rigid during feeding against the work surface. Consequently, the solutions that are disclosed in NO 315209 and U.S. Pat. No. 7,044,240 have a very limited effect before the drill bit has become fully engaged. This means that in cases in which the work surface is uneven, the drill bit may be damaged before the torque converter gets into function. To reduce or avoid said disadvantageous effect, tests have been performed with a reduction in the expansion forces acting on the drill bit, to bring the torque converter into function at a lower load, accordingly to provide a more "sensitive" torque converter. However, said tests have shown that such a more "sensitive" torque converter gives a reduced capacity during normal operation, drilling, that is.

From the publication US 2014262650, an apparatus for damping torsional oscillations to which a drill string may become subjected in a well, is known. The apparatus is axially rigid.

SUMMARY

The invention has for its object to remedy or reduce at least one of the drawbacks of the prior art, or at least provide a useful alternative to the prior art.

The object is achieved through the features which are given in the description below and in the claims that follow.

A regulating device according to the present invention is a development of features known from axial shock absorbers for drill strings and features from mechanical torque converters for drill strings.

The regulating device according to the invention enables both safe feeding and drilling with fixed, sharp cutters in hard rock. This is achieved by the regulating device being arranged in the lower part of the drill string, accordingly in the direction of the drill bit. The regulating device includes features from the torque converters according to NO 315209 and U.S. Pat. No. 7,044,240, but the solutions of the torque converters for the springs have been replaced with a balanced principle which has its starting point in, but is a development of, earlier axial shock absorbers.

The invention is defined by the independent claims. The dependent claims define advantageous embodiments of the invention.

In a first aspect of the present invention, a regulating device for use in a drill string between a drilling machine and a drill bit is provided, the regulating device comprising:
  a tubular female portion which at least partly surrounds a tubular male portion;
  a helical coupling between the female portion and the male portion to allow a telescoping movement of the regulating device in both directions between an extended position and a retracted position, said movement by the regulating device occurring when there is a difference in rotational speed between the female portion and the male portion;
  a first biasing device which is arranged to exert a driving force to drive the regulating device towards its extended position; and
  a second biasing device.

The regulating device in the second biasing device has an associated driving device whose axial position in the regulating device is controlled by mutual axial position of the male portion and the female portion by a portion of the driving device being axially connected to the male portion, that the male portion is subjected, via the driving device, to a force from the second biasing device, the force being opposite to the driving force from the first biasing device when the regulating device is in its extended position, and that the male portion is subjected, via the driving device, to a force from the second biasing device which is co-directional with the driving force from the first biasing device when the regulating device is in its retracted position, the second biasing device being axially displaceable in a second chamber which is axially defined by a shoulder and a ledge, the displacement of the second biasing device between said shoulder and said ledge being smaller than the telescoping movement of the male portion between the fully extended position and the fully retracted position.

The effect of this is that when the drill bit is off the bottom and the regulating device is in its fully extended position, the resistance to relative rotation between the male portion and the female portion will be smaller than when the regulating device is near its fully retracted position. Thus, the drill bit which is connected to the regulating device will be more "sensitive" when the regulating device is in its fully extended position, which is typically when the work surface is being established, than when the regulating device is near its most retracted or contracted position. When the regulating device is in its most contracted position and the weight-on-bit is maintained during the drilling operation, relative rotation of the male portion and the female portion cannot occur.

The second biasing device may be arranged to substantially balance the forces that are extending the regulating device into its extended position, when the regulating device is in its fully extended position. The forces extending the regulating device are said first biasing device and the gravitational force from the major part of the mass of the male portion.

The effect of this is that when the drill bit is off the bottom, said second biasing device will balance the considerable forces extending the regulating device into its fully extended position. With respect to the thrust on the drill bit, the male portion of the regulating device will appear almost "weightless". Thereby the friction in the helical coupling between the male portion and the female portion will also be the smallest one possible, which is favourable with a view to providing a regulating device which is very sensitive when in its most extended position.

When the drill bit meets the work surface at the bottom of the hole, the second biasing device will gradually be relieved in consequence of the regulating device contracting.

Thus, according to the present invention, a continued contraction of the regulating device will cause the second biasing device to be compressed together with the first biasing device of the regulating device. In this way, an increase in maximum biasing force is achieved, compared with the prior art. In sum, the invention gives an interval with the least possible risk of damage when the drill bit meets the contact surface. In the next place, a considerably improved maximum power capacity in the drilling phase is achieved. The regulating device according to the invention thereby gives improved protection and more reliable use of the optimized, sharp cutters mentioned initially, which are necessary for drilling in hard rock, while, at the same time, the total capacity will be higher. A person skilled in the art will know that in the same way as sharp cutters are necessary for cutting hard metal, sharp cutters are also a condition for drilling hard rock.

The first biasing device is preferably arranged in a first chamber in a portion of the female portion, the volume of the chamber being controlled by a piston associated with the male portion. Thereby the compression of the first biasing device is dependent on the axial position of the male portion relative to the female portion.

The driving device may include a first pressure plate and a second pressure plate which are individually movable in the second chamber, where the pressure plates are kept spaced apart by the second biasing device, and where the movements are controlled by a rod connected to said piston associated with the male portion. In one embodiment, the axial extent of the chamber is larger than the extent of the driving device.

In one embodiment, the second chamber is arranged in a portion of the female portion. In an alternative embodiment, the second chamber is arranged in a portion of the male portion.

Preferably, at least one of the biasing devices comprises a spring. Each of the at least one spring may be selected from the group: a helical spring or a series of disc springs. In the present invention, a series of disc springs is particularly well suited.

One of the advantages of using a spring as the biasing element instead of a biasing element based exclusively on a compressible fluid is that a spring may have a more predictable characteristic, thus be less susceptible to influence from, among other things, the temperature conditions prevailing in a petroleum well, for example. Besides, a compressible fluid would have to be placed in a closed chamber, which involves the use of seals with associated wear and friction problems. Accordingly, a spring is a technically simpler solution and appears, for the time being, to be the best solution for the field of application in question. But it should be emphasized that it is also conceivable to use fluid-based biasing elements as described below. This is because a fluid-based biasing element has advantages related to easy change of the fluid pressure and thereby adaptation of the power characteristics of the biasing element for specific drilling jobs.

In one embodiment, the first biasing device may further include a fluid under pressure. The biasing device may thus include both a spring and a fluid, as will be explained in connection with the exemplary embodiment below.

In a second aspect of the present invention, a method of controlling the weight-on-bit connected to a drilling machine via a drill string is provided, the method comprising: positioning a regulating device according to the first aspect of the invention in the drill string between the drilling machine and the drill bit; and running the drill string into and setting the drill string and drill bit in rotation in the borehole; and bringing the drill bit into engagement with a bottom portion of the borehole.

The method may further comprise arranging the regulating device between two drill collars which are integrated in a lower portion of the drill string near the drill bit.

The second biasing device may be arranged with such a power capacity that when the regulating device is in its most extended position, the second biasing device is arranged to balance the sum of the force from the first biasing device and a vertical component of the gravity of the mass of the components included in the lower drill-string portion.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 1:
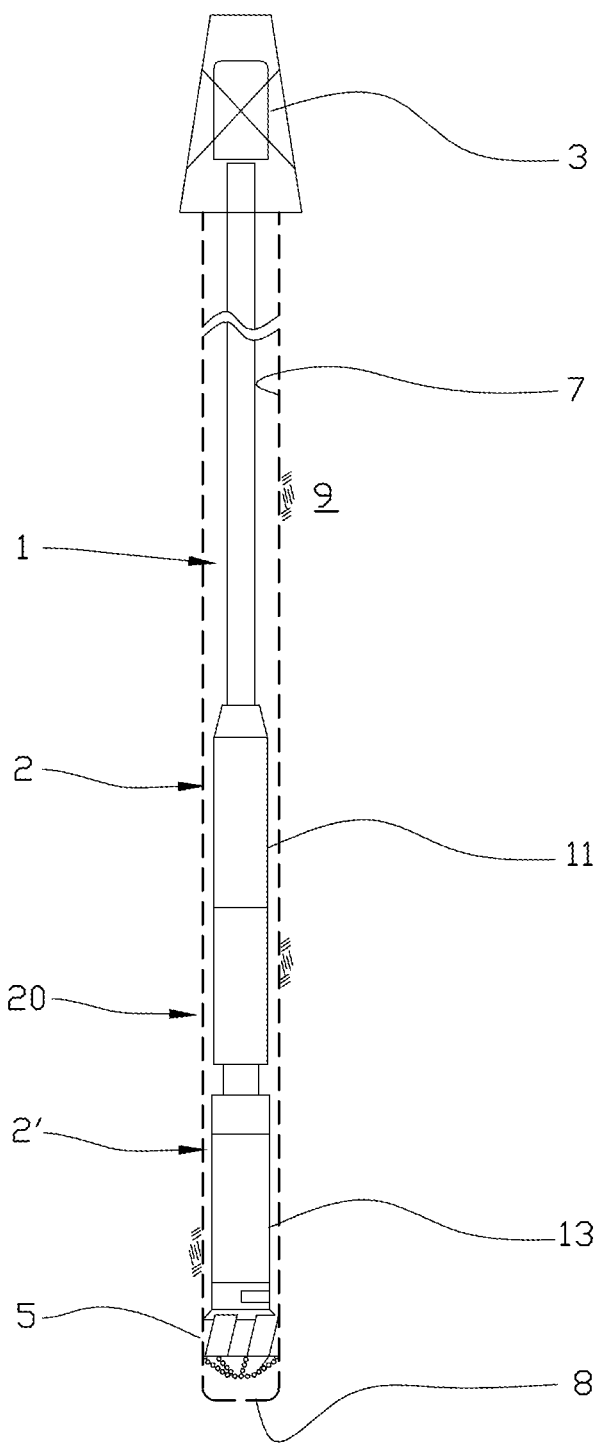
FIG. 1 shows a principle drawing of a drill string extending from a top-drive drilling machine to a drill bit which is near a bottom portion in a well, there being a regulating device according to the present invention arranged between two drill collars in a lower portion of the well.

In what follows, positional indications like "above", "below", "upper" and "lower" refer to the positions that the individual elements have in the figures.

Like or corresponding elements are indicated by the same reference numeral.

In the figures, the reference numeral 1 indicates a drill string which extends from a top-drive drilling machine 3, or just "top drive", to a drill bit 5. For a well on land, the drilling machine 3 may be arranged on a fixed or mobile drilling rig. For a subsea well, the drilling machine 3 will be arranged on a floating vessel.

By means of the drilling machine 3, the drill string 1 and thereby the drill bit 5 are arranged to be set in rotation around their longitudinal axis, as will be known to a person skilled in the art.

FIG. 1 shows, in principle, the drill string 1 and drill bit 5 after they have been run into a borehole 7 in a formation 9. The drill bit 5 is near a bottom portion 8 of the borehole 7. The borehole 7 will in what follows also be denoted well 7 or wellbore 7.

In the embodiment shown, the drill string 1 is provided with a first drill collar 11 and a second drill collar 13 of a kind known per se. The drill collars 11, 13 are integratedly arranged in a lower portion of the drill string 1 near the drill bit 5. A person skilled in the art will know that drill collars 11, 13 are used to provide weight-on-bit on the drill bit 5.

A regulating device 20 according to the present invention is arranged between the first drill collar 11 and the second drill collar 13, as shown in principle in FIG. 1. The purpose of the regulating device 20 is to limit or damp so-called jerking or "stick-slip" which may occur as the drill bit 5 engages a portion of the borehole 7, 8, or a transition zone as explained below.

In what follows, to facilitate the understanding of the invention, the drill string 1 has been divided into an upper drill-string portion 2 and a lower drill-string portion 2'.

The upper drill-string portion 2 comprises the portion of the drill string 1 which extends from the drilling machine 3, via the first drill collar 11 to (including) a female portion of the regulating device 20.

The lower drill-string portion 2' comprises the portion of the drill string 1 that comprises a male portion 40 of the regulating device 20, the second drill collar 13 and the drill bit 5. In what follows, the male portion will also be referred to as a telescoping device 40.

FIGS. 2-5 show the drill bit 5, the second drill collar 13 (shown shortened) and the regulating device 20 on a larger scale. For the sake of simplicity, the first drill collar 11 is shown only in FIGS. 2-3.

Figure 2:
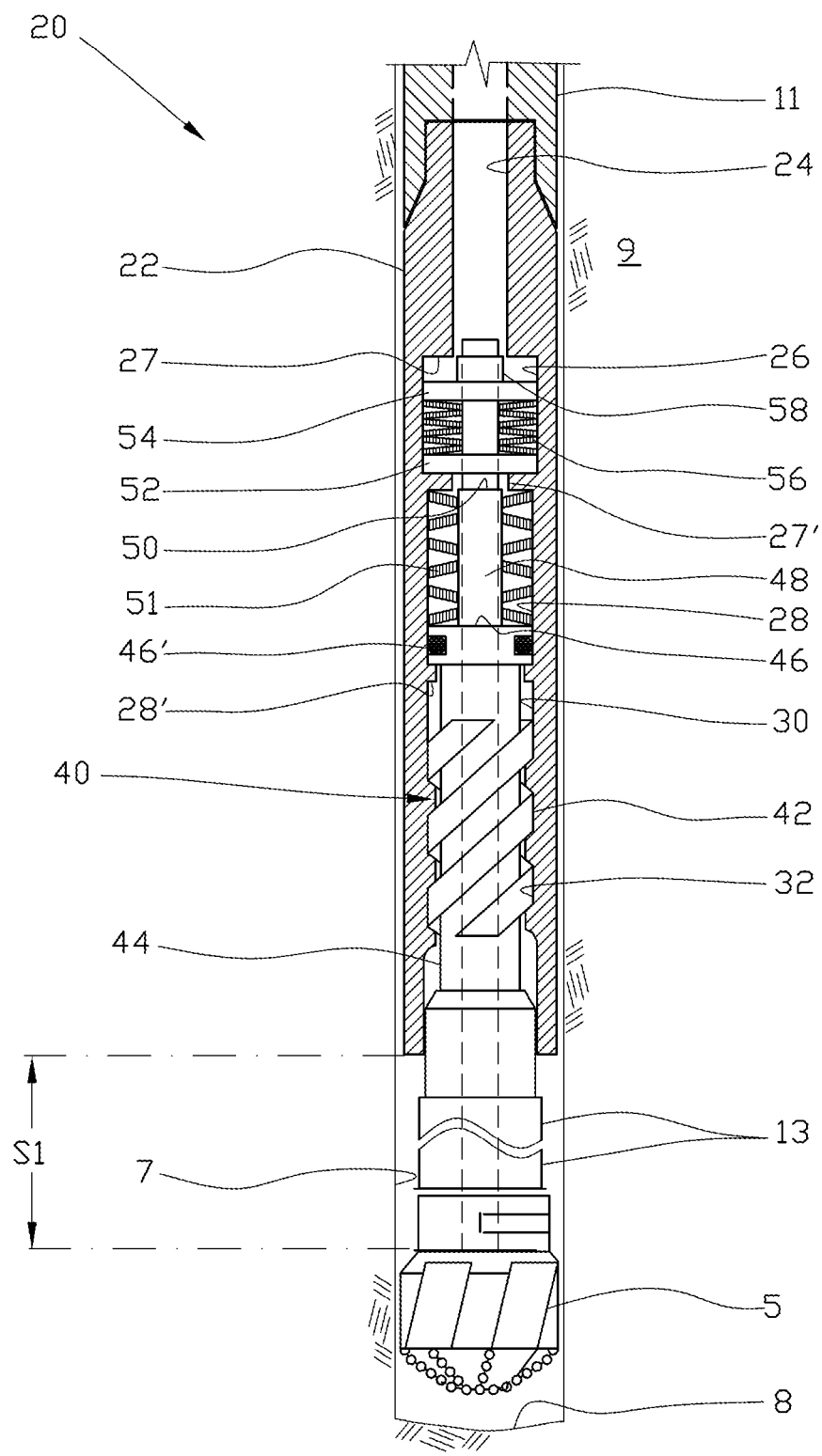
FIG. 2 shows a view on a larger scale, partially in perspective, of the regulating device which includes a female portion partially enclosing a male portion, the regulating device being in an extended position which it will have when the drill bit is at a distance from the bottom portion of the well, among other things.
Figure 3:
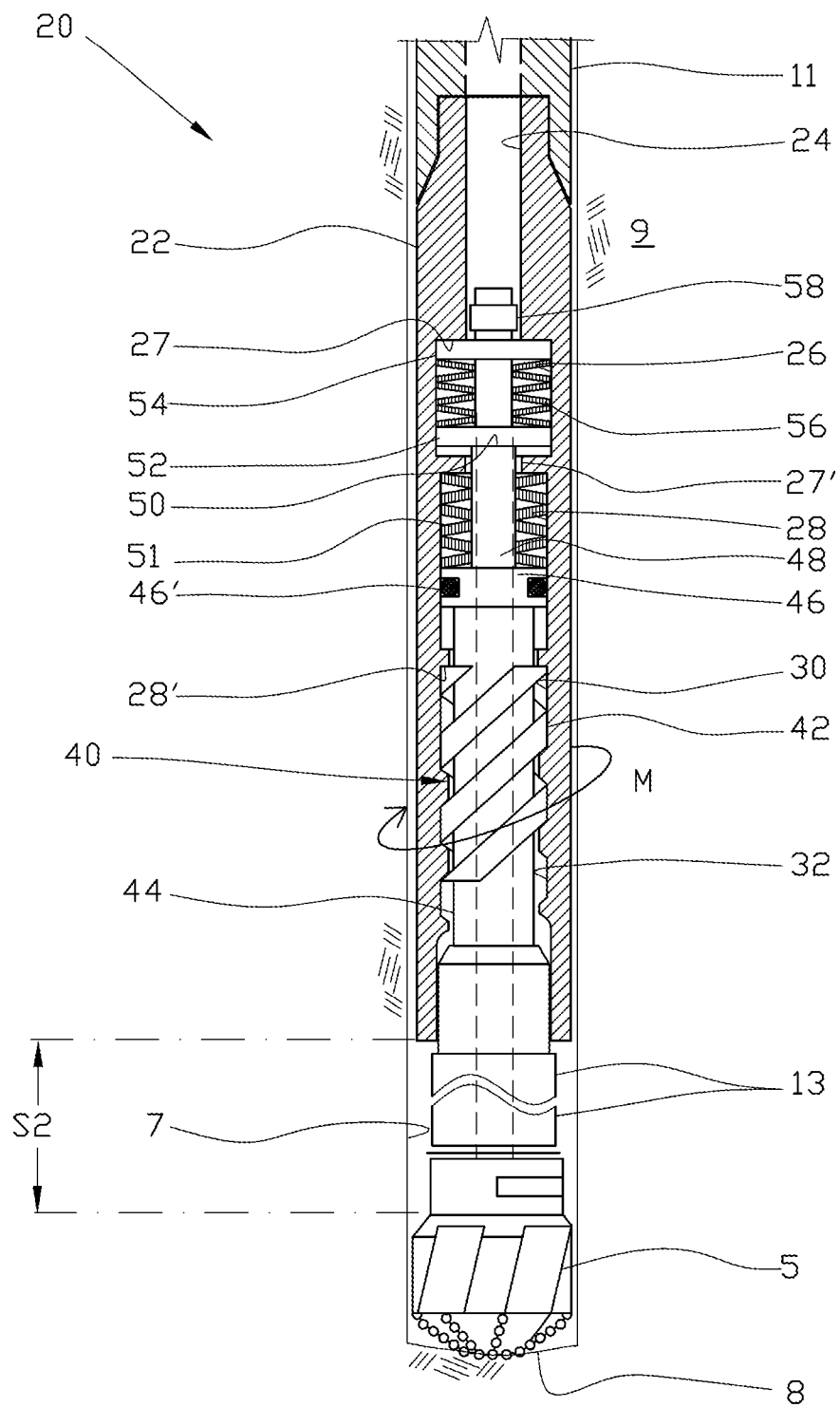
FIG. 3 shows the regulating device of FIG. 2, but the regulating device is in a retracted position in consequence of the drill bit having been brought into engagement with the bottom portion of the well.
Figure 4:
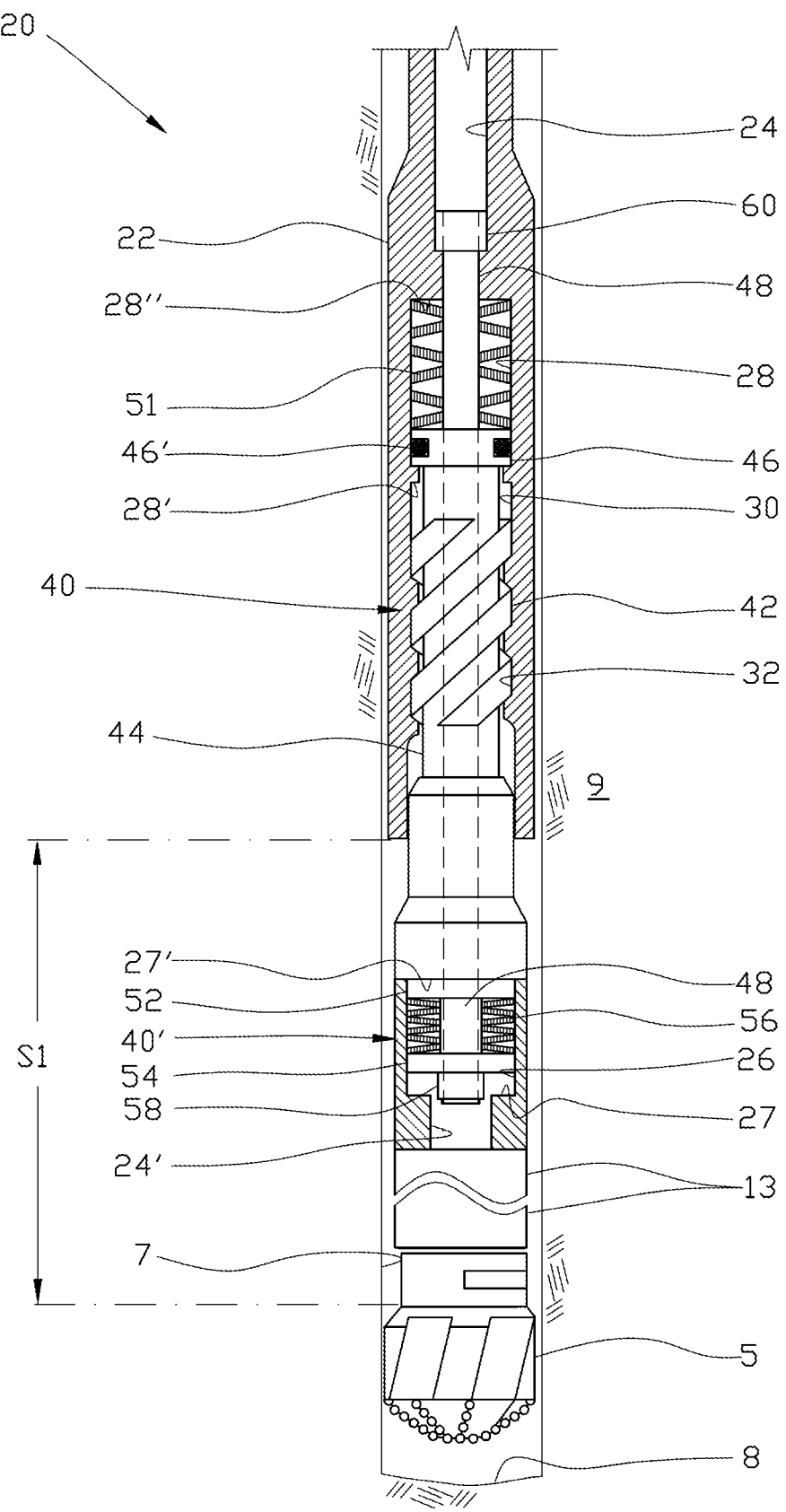
FIG. 4 shows an alternative embodiment of the regulating device shown in FIG. 2.
Figure 5:
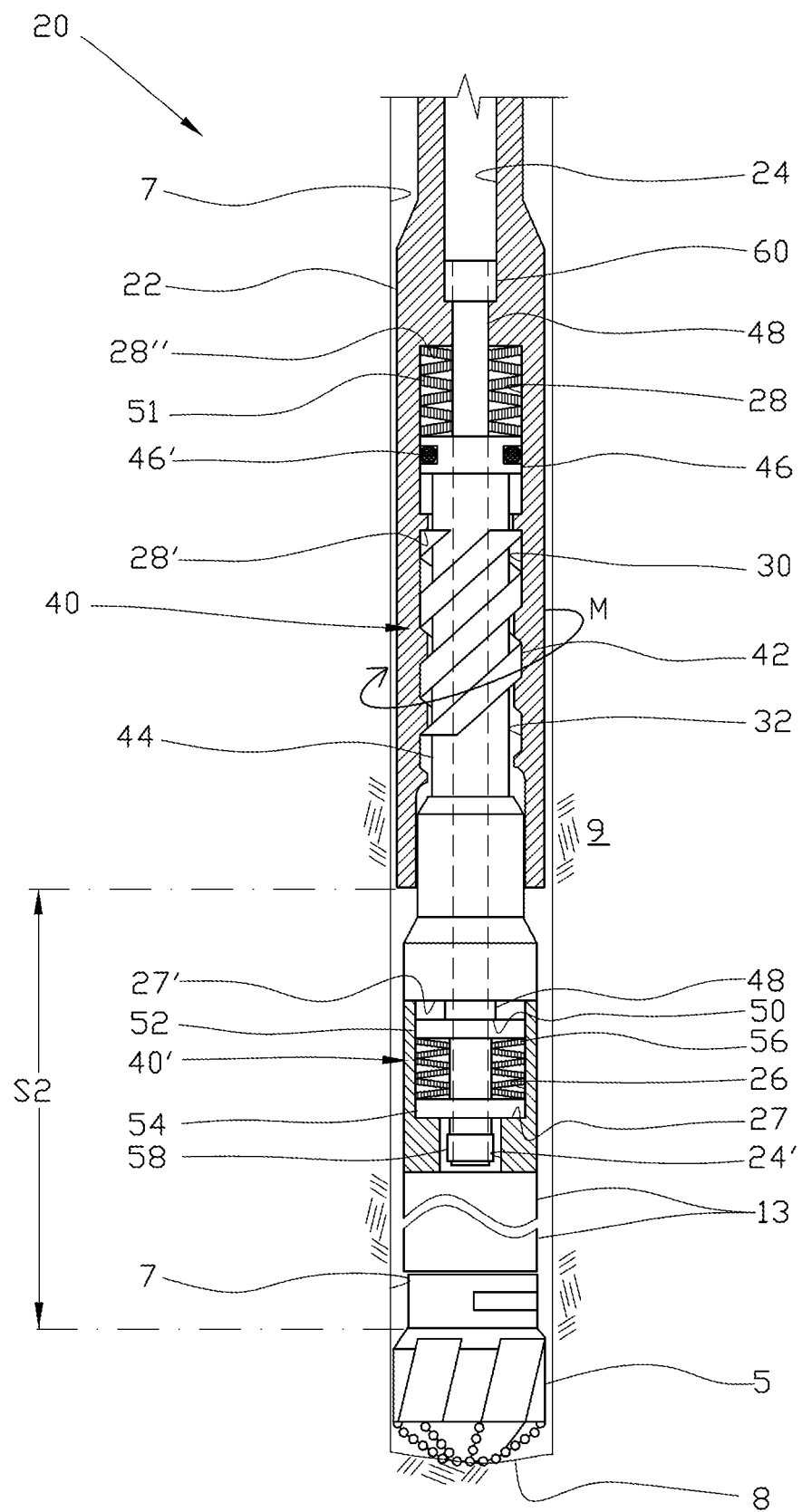
FIG. 5 shows the regulating device of FIG. 4 in a retracted position.

FIGS. 2 and 3 show a first embodiment of the present invention, whereas FIGS. 4 and 5 show a second embodiment of the present invention.

The regulating device 20 includes said female portion which is referred to as a housing 22 (shown in section) in what follows. The housing 22 is thus fixedly connected to the first drill collar 11 and forms part of the upper drill-string portion 2.

The housing 22 can be split along its longitudinal axis and includes two semicircular elements which are attached to each other by means of mechanical attachment means known per se.

The housing 22 encloses a portion of the male portion or the telescoping device 40. The telescoping device 40 is fixedly connected at its lower end portion to the drill bit 5 via the second drill collar 13. The telescoping device 40, the second drill collar 13 and the drill bit thus constitute the lower drill-string portion 2'.

The lower drill-string portion 2' is configured for a limited axial and rotational movement relative to the upper drill-string portion 2.

Reference is first made to the embodiment according to FIGS. 2 and 3.

The housing 22 is provided with four chambers: a fluid channel 24 for the supply of drilling fluid to the drill bit 5, a second chamber 26, a first chamber 28 and a rotation chamber 30. The fluid channel 24 is in fluid communication with the second chamber 26 and the first chamber 28 and with the drill bit 5 through a channel (shown in broken lines) through the regulating device 20.

The first chamber 28 is defined by a first ledge 27' which extends radially inwards from the jacket portion of the housing 22, the jacket portion of the housing 22 and a second ledge 28' which extends radially inwards from the jacket portion of the housing 22.

The second chamber 26 is defined by a shoulder 27, said first ledge 27' and the jacket portion of the housing 22.

The rotation chamber 30 is defined by said second ledge 28', the jacket portion of the housing 22 and the lower end portion of the housing 22.

The rotation chamber 30 is provided with a helical guide 32. The guide 32 is complementarily adapted to a helical thread 42 arranged on a stem 44 of the telescoping device 40 which is in the rotation chamber 30. As shown in the figures, the axial extent of the thread 42 is smaller than the axial extent of the rotation chamber 30. The stem 44 may thus be screwed in the housing 22 from the position shown in FIG. 2 to the position shown in FIG. 3, in which an upper end portion of the helical thread 42 has been brought into abutment against the second ledge 28'.

The telescoping device 40 further includes a piston 46 which is attached to an upper end portion of the stem 44. The piston 46 is further attached to a pipe 48 which extends axially through the first chamber 28 and the second chamber 26. In an upper end portion of the first chamber 28, the pipe 48 is provided with an external shoulder 50. The piston 46 is arranged to be axially movable and rotatable relative to the housing 22.

The piston 46 is provided with a sealing element in the form of an annular seal 46' to prevent drilling fluid from flowing from the first chamber 28 into the rotation chamber 30 and thereby leaking into the borehole 7.

The drill collar 13, the stem 44 and the pipe 48 are provided with a through channel (indicated in broken lines) to allow fluid communication between the fluid channel 24 and the drill bit 5. The pipe 48 is connected to a bore in the stem 44.

A biasing device in the form of a spring 51 is arranged in the first chamber 28 around the pipe 48 between the piston 46 and the ledge 27'. In what follows, the spring 51 will also be referred to as the main spring 51. In the embodiment shown, the biasing device also includes a fluid acting on the piston 46. The fluid acting against the piston 46 is in fluid communication, via the second chamber 26, with the fluid channel 24.

In the second chamber 26, a first pressure plate 52 is kept at a distance from a second pressure plate 54 by means of a biasing device in the form of a spring 56 which is also called a counterspring 56 in what follows. The pressure plates 52, 54 are axially and rotatably movable relative to the pipe 48. The pressure plates 52, 54 may alternatively or additionally be rotatable relative to the housing 22.

The springs 51, 56 are of a kind known per se and may typically be a series of disc springs or helical springs depending on the desired characteristics of the spring. In a prototype of the regulating device 20 according to the invention, a series of disc springs have been used, which turns out to function in a very satisfactory manner.

The axial movement of the pressure plates 52, 54 in the second chamber 26 is restricted by the ledge 27' and shoulder 27, respectively, and a stopping device 58 securely attached, for example by means of a threaded connection, to an upper end portion of the pipe 48.

From the description above, it will be understood that the telescoping device 40 is arranged to allow a limited rotation to be applied to it relative to the housing 22. The limitation is controlled by the axial position of the helical thread 42 in the rotation chamber 30.

In FIG. 2, the drill bit 5 is near, but at a distance from, a bottom portion 8 of the borehole 7. The drill bit 5 is in a "non-strained" position. In this position, the gravity of the mass of the telescoping device 40, the second drill collar 13 and the drill bit 5, that is to say the lower drill-string portion 2', and the force from the main spring 51 and the fluid pressure from the fluid acting against the upper portion of the piston 46, are balanced by an opposite force transmitted from the pipe 48 via the stopping device 58 to the second pressure plate 54, and from the second pressure plate 54 via the counterspring 56, the first pressure plate 52 to the first ledge 27' of the housing 22.

In this non-strained position, the male portion 40 will almost "float" relative to the female portion 22. This has the positive effect of the friction in the helical coupling 32, 42 being at a minimum. This further contributes to a reduced threshold value as will be discussed below.

By the very fact of the forces being balanced in the position shown, the stress between the bottom face of the piston 46 and the second ledge 28' will be close to zero.

In FIG. 2, the main spring 51 is in its most relieved position in the first chamber 28, whereas the counterspring 56 in the second chamber 26 is in its most compressed position. Consequently, the distance S1 between the lower end portion of the housing 22 and the drill bit 5 is the largest possible.

The regulating device 20 according to the invention is configured in such a way that undue compression of the counterspring 56 is prevented by the downward axial movement of the piston 46 being restricted by the second ledge 28'.

In FIG. 3, the drill bit 5 has been brought into engagement with the bottom portion 8 of the borehole 7. On the occurrence of such contact, the rotational speed of the drill bit 5 may be reduced in consequence of the friction that arises between the drill bit 5 and the bottom portion 8. By such a difference in rotational speed between the upper drill-string portion 2 and the lower drill-string portion 2', the thread 42 of the stem 44 will be screwed along the helical guide 32 of the housing 22 from the position that is shown in FIG. 2, until the upper end portion of the thread 42 is brought into abutment against the second ledge 28' as shown in FIG. 3. As such an axial motion between the housing 22 and the telescoping device 40 occurs in consequence of said rotational motion between the telescoping device 40 and the housing 22, the piston 46 will be moved upwards together with the piston 48 in the first chamber 28, and the main spring 51 will be compressed while, at the same time, the counterspring 56 is relieved and consequently is allowed to expand until the second pressure plate 54 has been brought into abutment against the shoulder 27 in the second chamber 26. When the compression of the main spring 51 continues, the external shoulder 50 of the pipe 48 will be brought into abutment against the first pressure plate 52 and through this compress the counterspring 56 against the second pressure plate 54 which in turn has been brought into abutment against the shoulder 27 in the upper end portion of the chamber 26. As mentioned, the pressure plates 52, 54 run freely on the pipe 48, but are prevented from moving in the axial direction beyond the stopping device 58, the shoulder 27 and the first ledge 27'. Accordingly, a further compression of the main spring 51 will involve or require concurrent compression of the counterspring 56.

The regulating device 20 is configured in such a way that before the upper end portion of the thread 42 has been brought into abutment against the second ledge 28', the shoulder 50 of the pipe 48 will be brought into abutment against a lower end face of the first pressure plate 52 and push this upwards in the first chamber 26. Consequently, the counterspring 56 will also be compressed and, together with the main spring 51 and the force from the fluid acting on the piston 46 in the first chamber 28, exert resistance to a further, last upward movement of the telescoping device 40. Accordingly, the counterspring 56, too, will exert a pressure on the drill bit 5.

Torque M occurring between the housing 22 and the telescoping device 40 as mentioned above, will lead to a reduction of the length S1. The reduction of the length S1 is counteracted by the main spring 51, the force from the fluid acting against the upper face of the piston 46 and the gravity from the mass of the drill collar 13 and the drill bit 5. Without the arrangement with the counterspring 56, the torque M required in order to balance the force from the fluid acting against the piston 46 and from the mass below the telescoping device 40 might constitute an unfavourable threshold value in relation to the range of action of the regulating device 20. However, as mentioned, the arrangement with the counterspring 56 balances said forces so that the reduction of the length from the length S1 shown in FIG. 2 to the length S2 in FIG. 3, happens relatively immediately, and then substantially without a threshold value, the moment the drill bit 5 is brought against the bottom portion 8 of the borehole 7, for example.

To sum up the above, it will thus be understood that as the piston 46 is driven upwards in the housing 22, the main spring 51 will be compressed. Concurrently with the occurrence of such a compression of the main spring 51, the counterspring 56 will be relieved. Accordingly, a constantly larger portion of the gravity of the mass of the telescoping device 40, the second drill collar 13 and the drill bit 5, that is to say the lower drill-string portion 2', will act against a further upward movement of the telescoping device 40.

In cases in which the strain on the drill bit 5 is great and the regulating device 20 is approaching its most retracted position as shown in FIG. 3, the counterspring 56 will be compressed again, as mentioned, but now in such a way that the force from the counterspring 56 acts in the same direction as the force from the main spring 51, the force from the fluid acting against the piston 46 and the gravitational forces from the telescoping device 40, the second drill collar 13 and the drill bit 5.

As shown in the exemplary embodiments, the helical coupling 32, 42 that transmits and converts torsional load separate from the springs 51, 56, runs in relation to the torque load, transmitting a codirectional axial load to and from the springs through the driving device which comprises the pipe 48. This has the effect of allowing the pipe 48, which is a central spring guide bushing, to be formed with the smallest possible outer diameter. Thereby, the series of disc springs may be formed with optimum dimensions, and without the use of disc springs arranged in parallel series, such as so-called double-packing or triple-packing which has to be used in some cases to achieve sufficient strength. A person skilled in the art will know that such a double- or triple-packing could generate increased internal friction and consequently a reduced overall efficiency and operational predictability.

In a prototype of the present invention, disc springs with a ratio of sizes of the external diameter to the internal diameter of approximately 1.95 are used, which is considered ideal in relation to recommended boundary values which are in the range of 2.45-1.76 for the relevant spring. The utilized ratio of sizes mentioned gives the disc springs their best possible properties in relation to operational stability, efficiency and length of life.

An important quality of the present invention is thus a quicker response, substantially without said threshold value and, at the same time, a considerable increase in the maximum load during drilling.

It should be noted that said "non-strained" position could also be the position that the drill bit 5 has when drilling through a uniform formation. But when penetrating an underlying formation of a different character that exerts greater friction or resistance to the progress of the drill bit 5, the effect could be the same as that shown in the exemplary embodiments. Said bottom portion 8 is thus to be understood as possibly being a transitional portion from a first formation to a second formation, where said second formation offers greater resistance to the rotation or progress of the drill bit 5.

Correspondingly, said bottom portion 8 could alternatively be the beginning of a sidetrack.

FIGS. 4 and 5 show an alternative embodiment of the apparatus shown in FIGS. 2 and 3.

The embodiment shown in FIGS. 4 and 5 bear several similarities to the embodiment shown in FIGS. 2 and 3. The main difference is that in FIGS. 4 and 5, the second chamber 26 is arranged in a lower portion 40' of the telescoping device 40 and not in a portion of the housing 22 as shown in FIGS. 2 and 3. The housing 22 of FIGS. 4 and 5 is thus provided with three chambers: a rotation chamber 30, a first chamber 28 and a fluid channel 24. The fluid channel 24 is in fluid communication with the first chamber 28 as explained below.

In what follows, some of the elements that are mentioned and that have designs or functions corresponding to those of the elements that have already been described in the discussion of FIGS. 2 and 3 will be mentioned in the definite form without having been specifically mentioned earlier in relation to FIGS. 4 and 5.

The first chamber 28 is defined by a shoulder 28", the jacket portion of the housing 22 and a second ledge 28' which extends radially inwards from the jacket portion of the housing 22.

The rotation chamber 30 is defined by said second ledge, 28', the jacket portion of the housing 22 and the lower end portion of the housing 22.

The first chamber 28 and the rotation chamber 30 shown in FIGS. 4 and 5 thus have a design substantially corresponding to the design shown in FIGS. 2 and 3. The same applies to the stem 44 with helical thread 42 arranged in the rotation chamber 30. The description of these will therefore not be repeated.

In FIGS. 4 and 5, a pipe 48 extends from the fluid channel 24 in the upper portion of the housing 22, via a bore in the stem 44 of the telescoping device 40 to a lower fluid channel 24' connected to the drill bit 5. The pipe 48 is provided with a through bore.

In FIGS. 4 and 5, the pipe 48 is terminated in an anchoring 60 attached to a portion of the fluid channel 24 in the housing 22 by means of attachment means (not shown) known per se, such as a threaded connection, bolts and/or latch pins. A lower portion of the pipe 48 has an associated stopping device 58 of the same kind as that shown in FIGS. 2 and 3.

In the embodiment shown, the piston 46 and the stem 44 are rotatable and axially displaceable relative to the pipe 48.

In the second chamber 26 arranged in the lower portion 40' of the telescoping device 40, a first pressure plate 52 is kept at a distance from a second pressure plate 54 by means of a biasing device in the form of a spring 56 which is also called a counterspring 56 in what follows. The counterspring 56 may be a series of disc springs. The pressure plates 52, 54 are axially and rotatably movable relative to the pipe 48. The pressure plates 52, 54 may alternatively or additionally be rotatable relative to the housing 22.

The axial movement of the pressure plates 52, 54 in the second chamber 26 shown in FIGS. 4 and 5 is defined by a rim portion 27' (corresponding to the ledge 27' in FIGS. 2 and 3) and a shoulder 27 and the stopping device 58 securely attached, for example by means of a threaded connection, to the lower portion of the pipe 48.

In FIG. 4, the drill bit 5 is in a "non-strained" position corresponding to that shown in FIG. 2. In this position, the gravitational force from the mass of the telescoping device 40, the second drill collar 13 and the drill bit 5 and the force from the main spring 51 and the fluid pressure acting against the upper portion of the piston 46 are balanced by an opposite force which is transmitted from the pipe 48 via the stopping device 58 to the second pressure plate 54. From the second pressure plate 54, the force path extends via the counterspring 56, the first pressure plate 52 to the rim portion 27' in the lower portion 40' of the telescoping device 40.

By the very fact of the forces being balanced in the position shown, the stress between the bottom face of the piston 46 and the second ledge 28' is close to zero.

In a manner corresponding to that shown in FIGS. 2 and 3, the regulating device 20 in the embodiment shown in FIGS. 4 and 5 is configured in such a way that too great a compression of the counterspring 56 is prevented by the downward axial movement of the piston 46 being restricted by the second ledge 28'.

In FIG. 5, the drill bit 5 has been brought into engagement with the bottom portion 8 of the borehole 7. On the occurrence of such contact, the rotational speed of the drill bit 5 will be reduced in consequence of the friction that arises between the drill bit 5 and the bottom portion 8. The thread 42 of the stem 44 may then be screwed along the helical guide 32 of the housing 22 from the position that is shown in FIG. 4 and, at a maximum, until the upper end portion of the thread 42 is brought into abutment against the second ledge 28' as shown in FIG. 5. As this axial movement between the housing 22 and the telescoping device 40 happens as a result of the rotational movement between the telescoping device 40 and the housing 22, the piston 46 which is attached to the stem 44 will be moved axially upwards along the pipe 48 in the first chamber 28. Consequently, the main spring 51 will be compressed. At the same time, the compression of the counterspring 56 will be reduced, and the second pressure plate 54 will be driven downwards by the counterspring 56 until the second pressure plate 54 has been moved into abutment against the shoulder 27 in the second chamber 26.

If the compression of the main spring 51 continues, an external shoulder 50 on the pipe 48 will be brought into abutment against the first pressure plate 52 and, through this, compress the counterspring 56 against the second pressure plate 54 which, in its turn, has been brought into abutment against the shoulder 27 in the lower end portion of the chamber 26. As mentioned, the pressure plates 52, 54 run freely on the pipe 48, but are prevented from moving in the longitudinal direction beyond the shoulder 50 of the pipe 48 and the shoulder 27. Consequently, a further compression of the main spring 51 will require concurrent compression of the counterspring 56.

The effect of the regulating device 20 shown in FIGS. 4 and 5 is thus the same as that of the regulating device shown in FIGS. 2 and 3, namely a quicker response, substantially without said threshold value and, at the same time, a considerable increase in the maximum load during drilling.

In the exemplary embodiments shown in FIGS. 2-5, the counterspring 56 and the pressure plates 52, 54 are in a position nearest to the main spring 51 when the regulating device 20 in its most extended position, and in a position the furthest away from the main spring 51 when the regulating device 20 is in its most retracted position.

In an alternative embodiment (not shown), the spring 56 in the second chamber 26 shown in FIGS. 4 and 5, for example, may be completely or partially replaced by a biasing element provided by means of a compressible fluid such as a gas. In such an embodiment, the pressure plates 52, 54 would have to be provided with external and internal ring seals to seal against the wall of the chamber 26 and the pipe 48, respectively. The pressure of a fluid chamber like that could be changed by means of suitable means known per se. Thus, the characteristics of the biasing element could easily be adapted for the drilling task before the string 1 is run into the well 7.

Correspondingly, the spring 51 in the first chamber 28 could also be completely or partially replaced by a biasing element provided by means of a compressible fluid. In such a case, a seal could relatively easily be placed in a portion between the anchoring 60 and the housing 22 and/or between an upper portion of the pipe 48 and the housing 22. Again, the pressure of such a fluid chamber could be changed by means of a suitable means, such as a valve device, and the characteristics of the biasing element could easily be adapted for the drilling task before the drill string 1 is run into the well 7.

The present invention thus provides a regulating device with a considerably improved working interval with the least possible risk of damaging the drill bit 5 when it meets the contact surface which may be the bottom portion 8 of a wellbore 7, a transition zone between two types of rock, or the beginning of a sidetrack. In the next place, a considerably improved maximum power capacity of drill bit 5 is achieved.

The invention thereby gives improved protection of sharp cutters which have been mentioned initially and which are necessary in order to drill hard rock while, at the same time, the overall capacity will be higher.

It should be noted that all the above-mentioned embodiments illustrate the invention, but do not restrict it, and persons skilled in the art may construct many alternative embodiments without departing from the scope of the dependent claims. In the claims, reference numbers in brackets are not to be regarded as restrictive. The use of the verb "to comprise" and its different forms does not exclude the presence of elements or steps that are not mentioned in the claims. The indefinite article "a" or "an" before an element does not exclude the presence of several such elements.

The fact that some features are mentioned in mutually different dependent claims does not indicate that a combination of these features cannot be used with advantage.

The invention claimed is:

1. A regulating device for use in a drill string between a drilling machine and a drill bit, the regulating device comprising:
   a tubular female portion which at least partly encloses a tubular male portion;
   a helical coupling between the female portion and the male portion to allow a telescoping movement of the regulating device in both directions between a fully extended position and a fully retracted position, said movement of the regulating device occurring when there is a difference in rotational speed between the female portion and the male portion;
   a first biasing device which is arranged to exert a driving force to drive the regulating device towards its extended position; and
   a second biasing device, wherein the second biasing device has an associated driving device whose axial position in the regulating device is controlled by mutual axial position of the male portion and the female portion, by a portion of the driving device being axially connected to the male portion, the second biasing device being axially displaceable in a second chamber which is axially defined by a shoulder and a ledge, the displacement of the second biasing device between said shoulder and said ledge being smaller than the telescoping movement of the male portion between the fully extended position and the fully retracted position, the second biasing device being compressed by the driving device in an axial direction towards the first biasing device when the regulating device is in its extended position, and compressed in an axial direction away from the first biasing device when the regulating device is in its retracted position;
   wherein the second biasing device has biasing characteristics capable of substantially balancing the forces that extends the regulating device into its extended position, when the regulating device is in its extended position.

2. The regulating device according to claim 1, wherein the first biasing device is arranged in a first chamber in a portion of the female portion, the volume of the chamber being controlled by a piston associated with the male portion.

3. The regulating device according to claim 2, wherein the second chamber is arranged in a portion of the female portion.

4. The regulating device according to claim 2, wherein the second chamber is arranged in a portion of the male portion.

5. A regulating device for use in a drill string between a drilling machine and a drill bit, the regulating device comprising:
   a tubular female portion which at least partly encloses a tubular male portion;
   a helical coupling between the female portion and the male portion to allow a telescoping movement of the regulating device in both directions between a fully extended position and a fully retracted position, said movement of the regulating device occurring when there is a difference in rotational speed between the female portion and the male portion;
   a first biasing device which is arranged to exert a driving force to drive the regulating device towards its extended position; and
   a second biasing device, wherein the second biasing device has an associated driving device whose axial position in the regulating device is controlled by mutual axial position of the male portion and the female portion, by a portion of the driving device being axially connected to the male portion, the second biasing device being axially displaceable in a second chamber which is axially defined by a shoulder and a ledge, the displacement of the second biasing device between said shoulder and said ledge being smaller than the telescoping movement of the male portion between the fully extended position and the fully retracted position, the second biasing device being compressed by the driving device in an axial direction towards the first biasing device when the regulating device is in its extended position, and compressed in an axial direction away from the first biasing device when the regulating device is in its retracted position;
   wherein the first biasing device is arranged in a first chamber in a portion of the female portion, the volume of the chamber being controlled by a piston associated with the male portion; and
   wherein the driving device includes a first pressure plate and a second pressure plate which are individually movable in the second chamber, the pressure plates being kept spaced apart by the second biasing device, and the movement being controlled by a rod connected to the piston.

6. The regulating device according to claim 1, wherein the first biasing device includes a spring, and wherein the second biasing device includes a spring.

7. The regulating device according to claim 6, wherein the first biasing device further comprises a fluid under pressure.

8. The regulating device according to claim 6, wherein each of the springs has been selected from the group: a helical spring or a series of disc springs.

9. A method of controlling weight-on-bit on a drill bit which is connected to a drilling machine via a drill string, the method comprising placing a regulating device in the drill string between the drilling machine and the drill bit; and running the drill string into and setting the drill string and the drill bit in rotation in the borehole; and bringing the drill bit into engagement with a bottom portion of the borehole;
   wherein the regulating device comprises:
   a tubular female portion which at least partly encloses a tubular male portion;
   a helical coupling between the female portion and the male portion to allow a telescoping movement of the regulating device in both directions between a fully extended position and a fully retracted position, said movement of the regulating device occurring when there is a difference in rotational speed between the female portion and the male portion;

a first biasing device which is arranged to exert a driving force to drive the regulating device towards its extended position; and a second biasing device, wherein the second biasing device has an associated driving device whose axial position in the regulating device is controlled by mutual axial position of the male portion and the female portion, by a portion of the driving device being axially connected to the male portion, the second biasing device being axially displaceable in a second chamber which is axially defined by a shoulder and a ledge, the displacement of the second biasing device between said shoulder and said ledge being smaller than the telescoping movement of the male portion between the fully extended position and the fully retracted position, wherein the second biasing device being compressed by the driving device in an axial direction towards the first biasing device when the regulating device is in its extended position, and compressed in an axial direction away from the first biasing device when the regulating device is in its retracted position; and wherein the second biasing device has biasing characteristics capable of substantially balancing the forces that extends the regulating device into its extended position, when the regulating device is in its extended position.

10. The method according to claim 9, wherein the regulating device is arranged between two drill collars which are integrated in a lower portion of the drill string near the drill bit.

11. A method of controlling weight-on-bit on a drill bit which is connected to a drilling machine via a drill string, the method comprising placing a regulating device in the drill string between the drilling machine and the drill bit; and running the drill string into and setting the drill string and the drill bit in rotation in the borehole; and bringing the drill bit into engagement with a bottom portion of the borehole;

wherein the regulating device comprises:

a tubular female portion which at least partly encloses a tubular male portion;

a helical coupling between the female portion and the male portion to allow a telescoping movement of the regulating device in both directions between a fully extended position and a fully retracted position, said movement of the regulating device occurring when there is a difference in rotational speed between the female portion and the male portion;

a first biasing device which is arranged to exert a driving force to drive the regulating device towards its extended position; and a second biasing device, wherein the second biasing device has an associated driving device whose axial position in the regulating device is controlled by mutual axial position of the male portion and the female portion, by a portion of the driving device being axially connected to the male portion, the second biasing device being axially displaceable in a second chamber which is axially defined by a shoulder and a ledge, the displacement of the second biasing device between said shoulder and said ledge being smaller than the telescoping movement of the male portion between the fully extended position and the fully retracted position, wherein the second biasing device being compressed by the driving device in an axial direction towards the first biasing device when the regulating device is in its extended position, and compressed in an axial direction away from the first biasing device when the regulating device is in its retracted position;

wherein the first biasing device is arranged in a first chamber in a portion of the female portion, the volume of the chamber being controlled by a piston associated with the male portion; and wherein the driving device includes a first pressure plate and a second pressure plate which are individually movable in the second chamber, the pressure plates being kept spaced apart by the second biasing device, and the movement being controlled by a rod connected to the piston.

\* \* \* \* \*